JOHN HEUERMANN, WILHELM STERNBERG & JOHN STUHR.
Improvement in Harvester Rakes.

No. 121,247. Patented Nov. 28, 1871.

UNITED STATES PATENT OFFICE.

JOHN HEUERMANN, WILHELM STERNBERG, AND JOHN STUHR, OF DAVENPORT, IOWA.

IMPROVEMENT IN HARVESTER-RAKES.

Specification forming part of Letters Patent No. 121,247, dated November 28, 1871.

*To all whom it may concern:*

Be it known that we, JOHN HEUERMANN, WILHELM STERNBERG, and JOHN STUHR, all of Davenport, in the county of Scott and State of Iowa, have invented a new and useful Improvement in Harvesters; and we do hereby declare that the following is a full and exact description of the same, reference being had to the accompanying drawing and to the letters of reference marked thereon.

This invention relates particularly to the mechanism for delivering the grain, as it falls upon the platform, in proper quantities and at suitable intervals to the binder to be bound; and consists in certain details of construction, which will be fully described hereinafter.

Figure 1:
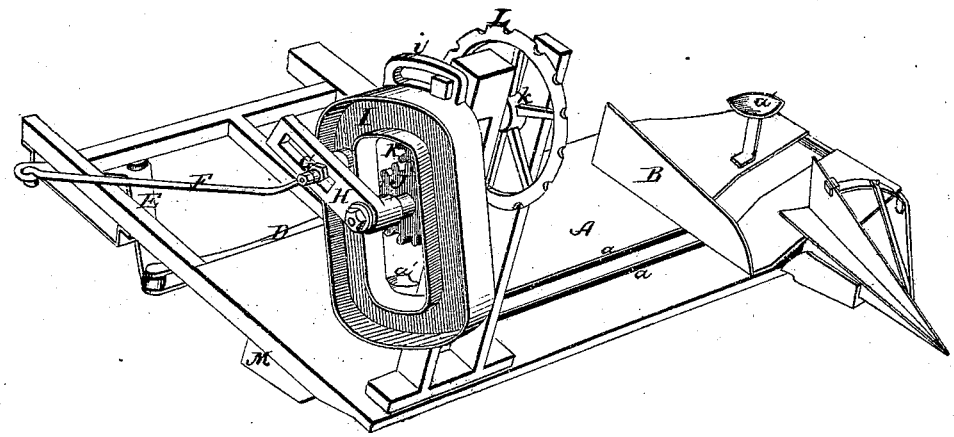
Figure 2:
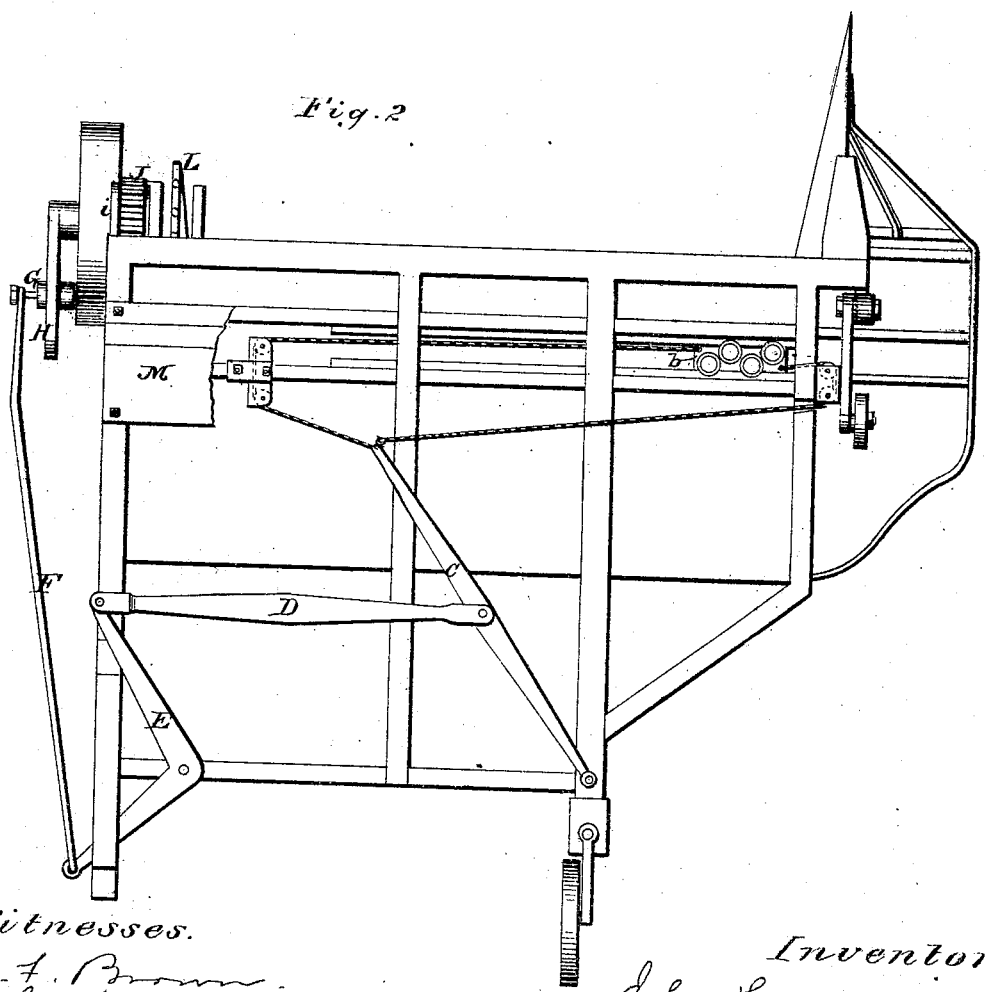

In the drawing, Figure 1 represents a perspective view of our improved harvester, and Fig. 2 a plan view of the same inverted.

To enable others skilled in the art to which our invention appertains to make and use the same, we will now proceed to describe fully its construction and manner of operation.

This invention may be generally described as follows: The platform is slotted and provided at each end with a seat for the person who binds. A rake is employed which has a reciprocating movement across the platform from side to side, which rake is operated by mechanism below the platform, the connection between the two being made through the slots. This mechanism consists mainly of a system of levers which actuate ropes or chains attached to the carriage of the rake, which ropes or chains pass about pulleys at each end of the platform. The levers are actuated by means of an arm moved by a slotted crank about an endless groove, the crank being operated by gear-wheels connected by proper means to the driving-power.

A represents the platform, which may be constructed generally in any proper manner, and be provided with the usual means of support. *a a* represent slots extending across it from side to side, as shown in the drawing. *a' a'* represent seats for the binders, one being located upon each side near the ends of the slots. B represents the rake, consisting of a suitable sheet, board, or frame of any proper material and construction, which is connected by means of arms extending through the slots to the rake-carriage *b* below the platform. This carriage is provided upon each side with friction-rollers having grooved faces, which rollers bear upon each side, as shown, against V-shaped ways. To the carriage at each end is attached a rope or chain, each of which passes about a pair of grooved pulleys near the end of the platform, and is attached to the free arm of the lever C, as shown. This lever is pivoted at a proper point upon one of the beams of the platform, and is actuated by means of the connecting-bar D attached to the long arm of the elbow-lever E, which latter is moved by the connecting-rod F, as shown. The rod F is connected in front to the arm G, which latter receives motion from the slotted crank H. The arm G moves in the cam I, and is provided with a friction-roller to facilitate its movement, as shown. It is also provided with a square shank and proper nuts and shoulders to enable it to slide freely in the slot of the crank. The latter is attached to a shaft turning in suitable bearings, which shaft is provided with a gear-wheel, J, engaging with pinion K upon shaft *k*. This shaft is actuated by means of the chain-pulley L, which receives its motion in any proper manner from the driving-power. Upon the shaft *k* is also located the reel. The cam I is formed in any proper case or box, and is provided with slotted ears *i*, by means of which it is adjustably secured to the vertical standard which supports it. M represents a protecting-box, which covers the mechanism immediately connected with the rake-carriage.

The operation is as follows: The grain is cut by the knives in any proper manner, and is delivered upon the platform by the reel in the usual way. By means of the reciprocating rake it is carried alternately to each side, and is thus conveniently located for the binders, who sieze the bundle presented at each movement and bind it. From the peculiar construction of the actuating mechanism the rake receives an intermittent motion—that is, it moves across the platform and then remains stationary for a time before its return movement. This result is accomplished as follows: The crank H has a regular revolving movement, which is received by intermediate connections from the driving power. This revolving movement is converted into an intermittent reciprocating movement of the rod F by means of the arm G, which moves in the cam I. The arm G, when moving either up or down in the vertical sides of the groove, simply elevates or depresses the free end of the rod F without moving it at all longitudinally, and it is only while it (the arm G) is being carried across the top or bottom of the groove that the rod F receives a longitudinal movement. This rod actuates the elbow-lever E, the connecting-bar D, and the lever C, which latter moves the rake-carriage. It therefore follows that the intermittent reciprocating movement of the rod F is directly communicated to the rake-carriage. In consequence of this operation of the rake the binder is enabled to gather his bundle while the rake remains stationary, and in the mean time, also, the platform is being covered with grain. By means of the slotted ears $i$ the cam I may be adjusted in such manner as to cause the arm G to give the rod F the necessary movement within the proper limits. For instance, if the box should be so adjusted that it would cause the rod F (when the arm G reached the rear side of the groove) to force the short arm of the elbow-lever E back against the end of the guide-bar upon which it slides, then it (the cam) could be moved forward so that the extreme rearward movement of the arm would not cause the arm of the elbow-lever to strike. The described machine is simple in its operation, and all the movements are positive.

Having thus fully described our invention, what we claim as new, and desire to secure by Letters Patent, is—

The combination of the slotted platform A, rake B with carriage $b$, chains and pulleys, levers C, connecting-bar D, lever E, rod F, arm G, crank H, and cam I with the connections described, as and for the purpose set forth.

JOHN HEUERMANN.
WILHELM STERNBERG.

Witnesses:
BK. PETERS,
FRANK KESSLER.
JOHN STUHR.

(74)